United States Patent
Gryko et al.

(10) Patent No.: US 8,245,186 B2
(45) Date of Patent: Aug. 14, 2012

(54) TECHNIQUES FOR OFFERING AND APPLYING CODE MODIFICATIONS

(75) Inventors: Izydor Gryko, Seattle, WA (US); Timothy A. Wagner, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1168 days.

(21) Appl. No.: 12/061,682

(22) Filed: Apr. 3, 2008

(65) Prior Publication Data

US 2009/0254880 A1 Oct. 8, 2009

(51) Int. Cl.
*G06F 9/44* (2006.01)

(52) U.S. Cl. ........ 717/110; 717/106; 717/107; 717/108; 717/116; 715/826

(58) Field of Classification Search .................. 717/110, 717/117
See application file for complete search history.

(56) References Cited

U.S. PATENT DOCUMENTS

| | | | | |
|---|---|---|---|---|
| 5,875,331 | A * | 2/1999 | Lindsey | 717/108 |
| 5,974,256 | A * | 10/1999 | Matthews et al. | 717/141 |
| 6,941,558 | B2 | 9/2005 | Hill et al. | |
| 7,054,917 | B1 * | 5/2006 | Kirsch et al. | 709/217 |
| 7,127,707 | B1 | 10/2006 | Mishra et al. | |
| 7,155,706 | B2 | 12/2006 | Snover et al. | |
| 7,325,226 | B2 * | 1/2008 | Pepin et al. | 717/108 |
| 7,376,902 | B2 * | 5/2008 | Lueckhoff | 715/752 |
| 7,844,891 | B2 * | 11/2010 | Chandra | 715/208 |
| 7,966,623 | B2 * | 6/2011 | Chandra | 719/328 |
| 2003/0200533 | A1 * | 10/2003 | Roberts et al. | 717/124 |
| 2004/0031017 | A1 | 2/2004 | Vaidyanathan et al. | |
| 2004/0078785 | A1 * | 4/2004 | Dutt et al. | 717/136 |
| 2005/0091201 | A1 * | 4/2005 | Snover et al. | 707/3 |
| 2005/0131677 | A1 * | 6/2005 | Assadollahi | 704/201 |
| 2005/0154742 | A1 * | 7/2005 | Roth et al. | 707/100 |
| 2006/0150150 | A1 * | 7/2006 | Tiwari et al. | 717/110 |
| 2006/0218446 | A1 | 9/2006 | Crawford | |
| 2007/0168909 | A1 | 7/2007 | Vaidyanathan et al. | |
| 2008/0028364 | A1 * | 1/2008 | Triou et al. | 717/104 |
| 2008/0066030 | A1 * | 3/2008 | Hekmatpour et al. | 716/5 |
| 2008/0072196 | A1 * | 3/2008 | Hekmatpour et al. | 716/5 |
| 2009/0064196 | A1 * | 3/2009 | Richardson et al. | 719/327 |
| 2009/0070786 | A1 * | 3/2009 | Alves et al. | 719/318 |
| 2009/0125878 | A1 * | 5/2009 | Cullum et al. | 717/106 |

OTHER PUBLICATIONS

Title: Model-driven Composition of Context-aware Web Services Using ContextUML and Aspects, Prezerakos, G.N et al, source: IEEE, dated: Jul. 9, 2007.*

(Continued)

*Primary Examiner* — Chameli Das
(74) *Attorney, Agent, or Firm* — Zete Law, P.L.L.C.; MacLane C. Key

(57) ABSTRACT

Various technologies and techniques are disclosed for offering and applying source code modifications based upon a context of a user in a development environment. For example, code snippets can be offered to the user and customized programmatically. A code editor accepts user input comprising source code. Code snippets of sample source code are stored in a data store. A code completion tool monitors user actions and detects a triggering action in the monitored user actions. A code snippet associated with the triggering action is identified. An option is offered representing the code snippet. In response to user selection of the option, the associated code snippet is inserted into the code editor and is automatically customized based upon the user context. As another example, aspect-oriented source code transformations are offered based upon the user context. As yet another example, solutions to commonly problematic tasks are offered based upon the user context.

20 Claims, 12 Drawing Sheets

OTHER PUBLICATIONS

Gerhart, "Correctness-preserving program transformations", Annual Symposium on Principles of Programming Languages, Proceedings of the 2nd ACM SIGACT-SIGPLAN symposium on Principles of programming languages, California, Year of Publication: 1975, pp. 54-66.

Samsom, et al., "SynGuide: An environment for doing interactive Correctness Preserving Transformations", IEEE workshop on VLSI signal processing, Veldhoven, The Netherlands, Oct. 1993. Also in VLSI Signal Processing VI, (eds.: L. Eggermont, P. Dewilde, E. Deprettere, J. van Meerbergen), IEEE Press, New York, Dated: 1993, pp. 269-277.

Bernardeschi, et al., "Transformations and Consistent Semantics for ODP Viewpoints", Proceedings of the IFIP TC6 WG6.1 international workshop on Formal methods for open object-based distributed systems, UK, Year of Publication: 1997, pp. 371-386.

Gibson, et al., "The Application of Correctness Preserving Transformations to Software Maintenance", ICSM, Proceedings of the International Conference on Software Maintenance (ICSM'00), Year of Publication: 2000, pp. 1-10.

Butler, et al., "The Refinement Calculator: Proof Support for Program Refinement", In: Proc. Conf. Formal Methods Pacific'97, Springer Series in Discrete Mathematics and Theoretical Computer Science, Dated: 1997, http://eprints.ecs.soton.ac.uk/550/.

Jones, "Compiling Haskell by program transformation: a report from the trenches", Lecture Notes in Computer Science; vol. 1058, Proceedings of the 6th European Symposium on Programming Languages and Systems, Dated: Jan. 31, 2006, pp. 18-44.

Smith, "KIDS—A Knowledge-Based Software Development System", In Automating Software Design, M. Lowry & R. McCartney, Eds. AAAI/MIT Press, 1991, pp. 483-514.

* cited by examiner

CODE EDITOR — ☐ X

```
SUB LOGIN ( )
    DIM DB CONN
    DBCONN = NEW DBCONNECTION ("PROVIDER = [PROVIDER NAME]; DATA SOURCE
        = [DATA SOURCE]")
    DIM   STRUSERNAME AS STRING
    DIM   STRPASSWORD AS STRING

STRUSERNAME = TXTUSERNAME.TEXT  ⟵ 162
```

164 — IT APPEARS THAT YOU ARE CREATING A LOGIN VALIDATION PROCESS TO VERIFY USER CREDENTIALS ENTERED ON A FORM AGAINST VALUES IN A DATABASE. A CODE SNIPPET IS AVAILABLE THAT CAN BE AUTOMATICALLY COMPLETED BASED UPON INFO YOU HAVE ENTERED SO FAR. SELECT THE APPLY OPTION BELOW TO INSERT THIS SNIPPET WITH THE CUSTOMIZATIONS.

[ APPLY ] — 166      [ CANCEL ] — 168

```
END SUB
```

```
CODE EDITOR                                              - ⊡ X

SUB LOGIN ()
    DIM DB CONN
    DBCONN = NEW DBCONNECTION ("PROVIDER = [PROVIDER NAME]; DATA SOURCE
        = [DATA SOURCE]")
    DIM   STRUSERNAME AS STRING
    DIM   STRPASSWORD AS STRING

STRUSERNAME = TXTUSERNAME.TEXT
    STRPASSWORD = TXTPASSWORD.TEXT

[CODE TO CONNECT TO THE DATABASE WAS INSERTED HERE]
    [CODE TO HANDLE EVALUATION OF LOGIN WAS INSERTED HERE]
    [CODE TO HANDLE LOGIN FAILURE WAS INSERTED HERE]

'YOU SHOULD INSERT YOUR CODE FOR HANDLING
    'SUCCESSFUL LOGIN HERE

END SUB
```

PUBLIC ASPECT LOGINTERCEPTOR
{
  PUBLIC OBJECT INVOKE()
  {
    LOGGER.DOLOGGINGBEFORE();
    METHOD.EXECUTE();
    LOGGER.DOLOGGINGAFTER();
  }
}

244

SUB LOGIN ()
  DIM DB CONN
  DBCONN = NEW DBCONNECTION ("PROVIDER = [PROVIDER NAME]; DATA SOURCE = [DATA SOURCE]")
  DIM    STRUSERID AS STRING
  DIM    STRPWD AS STRING

STRUSERID = TXTUSERNAME.TEXT
  STRPWD = TXTPASSWORD.TEXT

'CODE TO CONNECT TO THE DATABASE IS HERE
  'CODE TO HANDLE EVALUATION OF LOGIN IS HERE
  'CODE TO HANDLE LOGIN FAILURE IS HERE

'CODE FOR HANDLING ACTION AFTER 'SUCCESSFUL LOGIN HERE

END SUB

CODE EDITOR — ☐ X

SUB PERFORMCALCULATION (BYVAL INTVALUE AS INTEGER)

DIM INTCOUNTER AS INTEGER
DIM INTRESULT AS INTEGER

INTCOUNTER = 0

292 —— 'YOU NEED TO INSERT CODE HERE THAT MODIFIES THE VALUE OF INTCOUNTER TO SOMETHING
'OTHER THAN ZERO TO AVOID THIS ERROR, SINCE YOU JUST INITIALIZED THE VALUE TO 0 ABOVE

INTRESULT = INTVALUE / INTCOUNTER

END SUB

FIG. 11

TECHNIQUES FOR OFFERING AND APPLYING CODE MODIFICATIONS

BACKGROUND

Software developers typically create software by writing source code in one or more programming languages. Software has increased in complexity due to advances in computer processing power and user expectations. As a result, the development of such software has also become more complex. Many software development environments have been created to make the task of writing simple or complex software applications easier. These software development environments typically include code editors for viewing and editing the source code across multiple files. They also typically include debugging, testing, and deployment tools that make it easier to create, test, and deploy the software applications.

From within some code editors in many software development environments, the user is presented with options to complete the statement they are typing. For example, after the user types the name of a function to call, the list of parameters accepted by that method may be displayed. As the user types the name of an object that is present in a particular class object hierarchy, the methods or properties that are supported by the selected object may be displayed in a drop-down list to assist the user in completing the task. These code statement completion features have become widely accepted, and have aided greatly in the development of software. The user no longer has to keep a book or complex object model handy to determine what methods or properties a given object supports, because the code statement completion features in many software development environments provide this information to the user as they type lines of code within the development environment.

However, as noted earlier, software development is increasing in complexity every day. There are times when the software developer needs help with completing a higher level task that may not even be related to a specific line of code being typed at the current moment. Thus, simple code statement completion does not assist a user in such a scenario.

SUMMARY

Various technologies and techniques are disclosed for offering and applying source code modifications based upon a context of a user in a development environment. For example, code snippets can be offered to the user and customized programmatically. A code editor accepts user input comprising source code. Code snippets of sample source code are stored in a data store. A code completion tool monitors user actions and detects a triggering action in the monitored user actions. A code snippet associated with the triggering action is identified. An option is offered representing the code snippet. In response to user selection of the option, the associated code snippet is inserted into the code editor and is automatically customized based upon the user context.

In another implementation, aspect-oriented source code transformations are offered based upon the user context. In response to user selection of the option, the aspect-oriented action is applied to existing source code. As a few non-limiting examples, logging, transactional support, error handling, and/or other features can be offered to the user and then applied to one or more selected units of source code.

In yet another implementation, solutions to commonly problematic tasks are offered based upon the user context. A data store containing solutions to commonly problematic tasks is accessed to identify a source code suggestion associated with the triggering action. An option representing the source code suggestion is offered to the user. In response to user selection of the option, the source code suggestion is applied to existing source code. As one non-limiting example, a divide by zero error can be identified and a suggestion on how or where to fix the problem inserted into the source code.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is a simulated screen for one implementation that illustrates the offering of a code snippet to the user in a development environment.

FIG. 5 is a simulated screen for one implementation that illustrates applying the selected code snippet to the existing source code and customizing the code snippet based upon the current context of the user.

FIG. 8 illustrates some exemplary source code that shows how an aspect can be applied to the existing source code shown in FIG. 7.

FIG. 11 is a simulated screen for one implementation that illustrates the insertion of a comment on how to fix the problem at the proper place in the existing source code.

DETAILED DESCRIPTION

The technologies and techniques herein may be described in the general context as an application that offers and applies code modifications, but the technologies and techniques also serve other purposes in addition to these. In one implementation, one or more of the techniques described herein can be implemented as features within a software development program such as MICROSOFT® Visual Studio, or from any other type of program or service that enables users to develop software applications.

Figure 1:
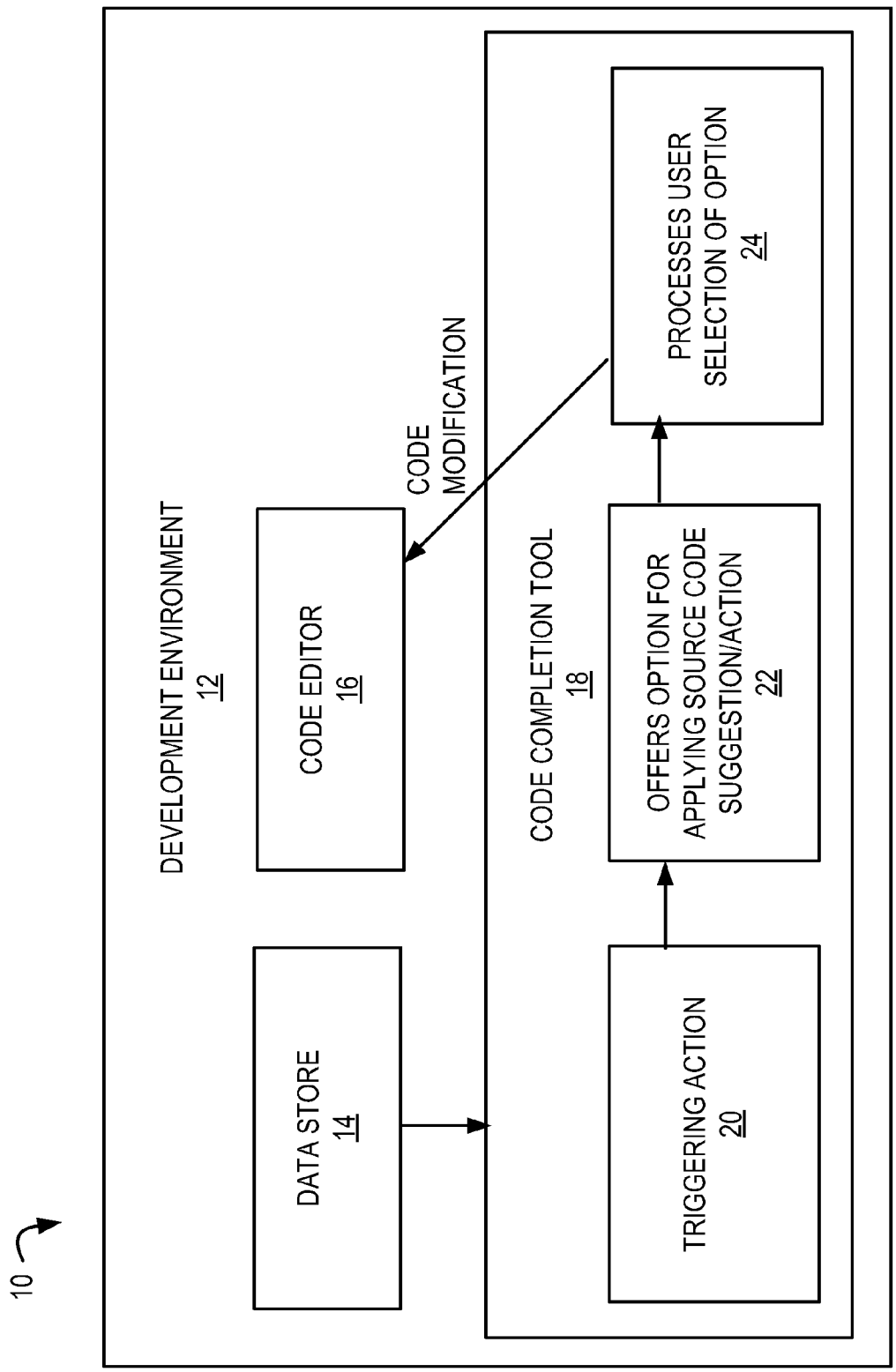
FIG. 1 is a diagrammatic view of a code modification system of one implementation.

FIG. 1 is a diagrammatic view of a code modification system 10 of one implementation. A software development environment 12 contains a data store 14, code editor 16, and code completion tool 18. The term "software development environment" as used herein is meant to include one or more applications or services that enable a user to develop one or more portions of a software application. The term "data store" as used herein is meant to include one or more databases, files, or other data storage mechanisms that can store data on a storage device. The term "code editor" as used herein is meant to include an application or service that enables a user to view and edit source code for a software application. The term "code completion tool" as used herein is meant to include an application or service that monitors user actions during source code input and offers code completion options to the user.

Code modification system 10 is used to offer code modification suggestions to the user in the development environment 12. In one implementation, code modification system 10 offers code modification suggestions that are related to the current context of the user, but that help solve a broader problem that the user may be working on than just the completion of a single line of code. These code modification suggestions can be stored in data store 14 or in any suitable location. Data store 14 can be located on the same or one or more totally separate computing devices than the one hosting development environment 12. Code editor 16 can be used to modify source code that is contained in one or more source code files, and in one or more programming language formats.

User actions are monitored as the user works in development environment 12, such as when writing source code within code editor 16. The term "user action" as used herein is meant to include any action performed by the user while they are working with development environment 12. System 10 detects when a triggering action 20 occurs in the monitored user actions. The term "triggering action" as used herein is meant to include some action that is initiated at least in part by an action of the user that is based upon a current context of the user, and which causes the system to detect that some other action could be considered. A few non-limiting examples of a triggering action can include the typing of one or more partial or complete lines of code in a code editor 16 or the selection of a class or other entity because the user wants to see what available options exist for the selected class or other entity. However, it should be noted that triggering actions within the current context may be caused by actions outside of conventional text editing, such as while the user is interacting with designers or other visual programming techniques within the development environment 12. The term "current context" as used herein is meant to include user actions, development environment conditions, cursor location, open source code files, and/or other factors that are present at the current moment in the development environment in which the user is working.

Once a triggering action 20 is detected, data store 14 or another suitable location can be accessed to determine whether an option for modifying source code is available for the triggering action 20. If an option for modifying source code is found in data store 14 or another location, then the option 22 is offered to the user to apply the source code suggestion and/or action to the existing source code. One example of an option that can be offered to the user includes one or more code snippets that are related to the current user context, as described in further detail in FIGS. 3-5. Another example of an option that can be offered to the user includes one or more aspect-oriented tasks that are related to the current user context, as described in further detail in FIGS. 6-8. Yet another example of an option that can be offered to the user includes one or more source code suggestions that are based on commonly problematic tasks that are related to the current context of the user, as described in further detail in FIGS. 9-11.

In response to a user selection of the option 22, then the system processes the user selection 24 of the option by modifying the existing source code as appropriate to apply the option. Source code can be modified, deleted, and/or added in one or more places when applying the selected option. In one implementation, the source code that is modified can include source code in multiple programming languages that make up a given project. In other words, in some implementations, code modification system 10 is capable of offering and making code modifications that span multiple programming languages. Code modification system 10 and several example uses for code modification system 10 are described in further detail in FIGS. 2-11, which will now be discussed.

Turning now to FIGS. 2-11, techniques for implementing one or more implementations of code modification system 10 are described in further detail. In some implementations, the processes of FIG. 2-11 are at least partially implemented in the operating logic of computing device 300 (of FIG. 12).

Figure 2:
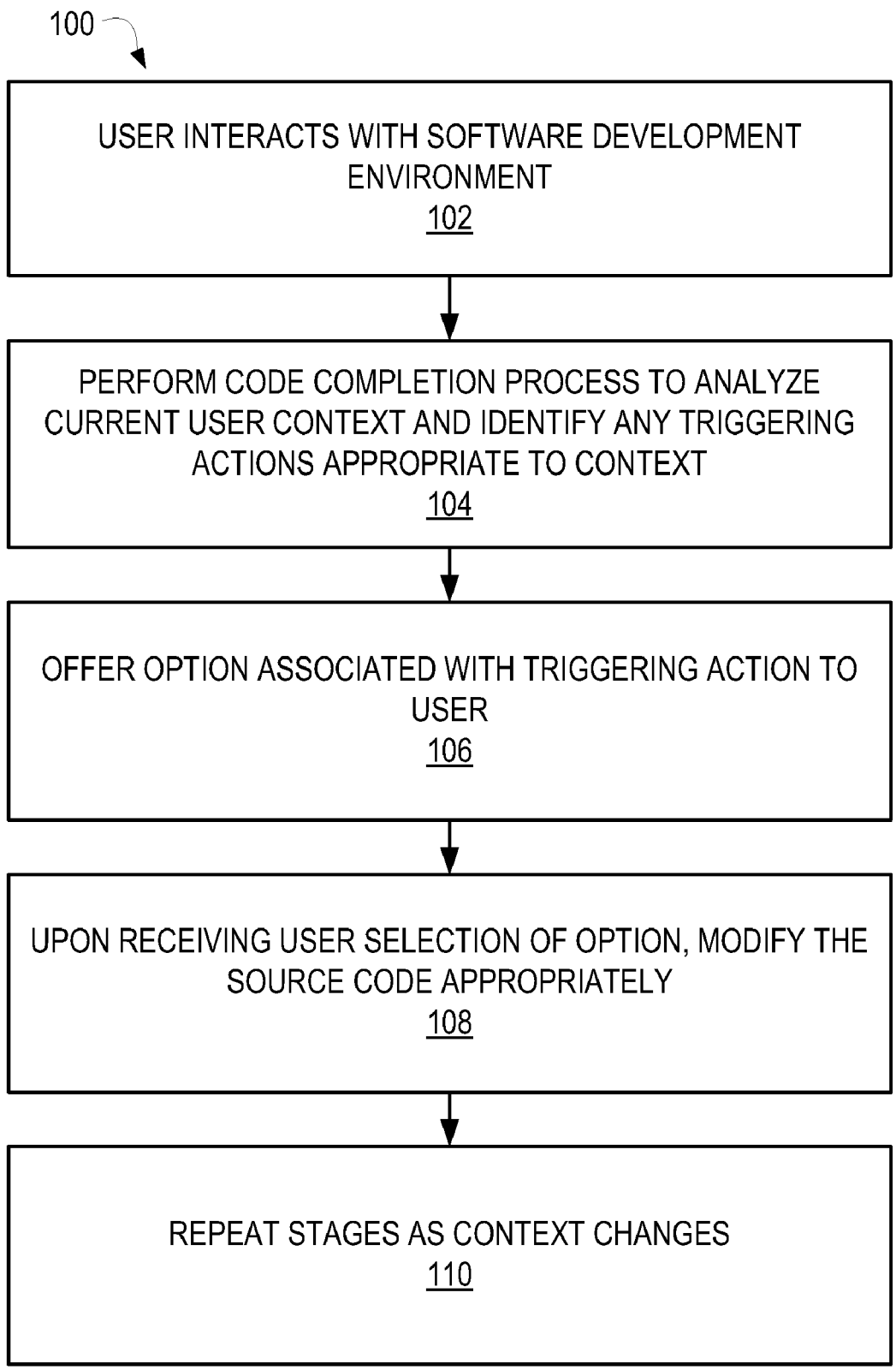
FIG. 2 is a process flow diagram for one implementation illustrating the stages involved in offering code modification options and applying the options upon user request.

FIG. 2 is a process flow diagram 100 that illustrates one implementation of the high level stages involved in offering code modification options and applying the options upon user request. These stages are introduced briefly and at a high level in FIG. 2, and then discussed in further detail in the example implementations of FIGS. 3-11.

The user interacts with the software development environment (stage 102), such as by typing source code into a code editor, or performing other actions available from within the development environment. A code completion process is performed to analyze the current user context and to identify any triggering actions that are appropriate to the context (stage 104). One or more code modification options associated with the triggering action are then offered to the user (stage 106). Upon receiving user selection of the option, the source code is modified appropriately (stage 108). The stages are repeated as necessary as the context changes (stage 110). Three example implementations will now be described in the figures that follow.

Figure 3:
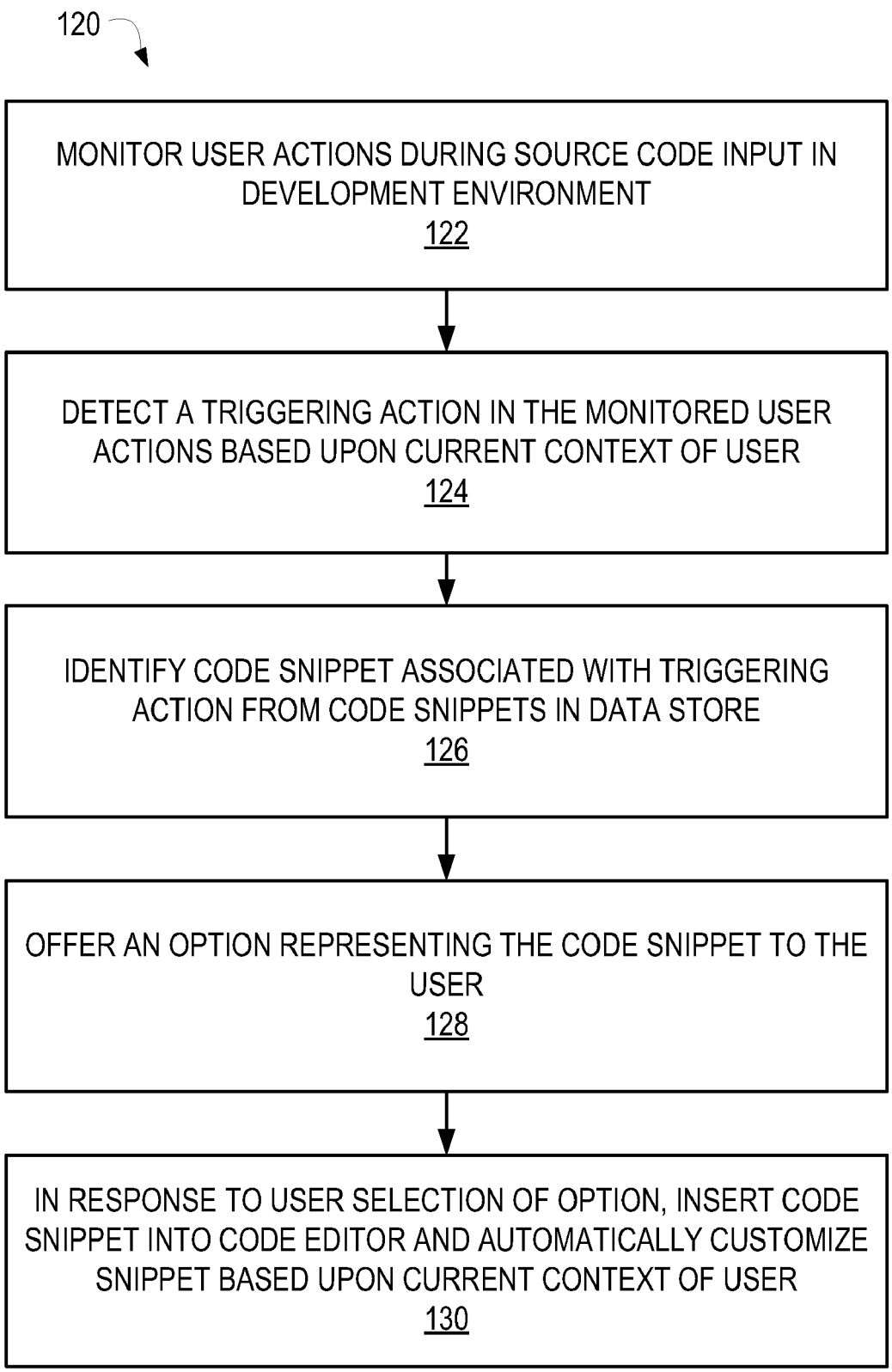
FIG. 3 is a process flow diagram for one implementation illustrating the stages involved in offering code snippets based upon user context and automatically customizing the code snippets for the user.

FIG. 3 is a process flow diagram 120 that illustrates one implementation of the stages involved in offering code snippets based upon user context and automatically customizing the code snippets for the user. The term "code snippet" as used herein is meant to include an example source code listing that describes how to perform one or more specified tasks. Code snippets can contain one or more code placeholders that can be filled in with variables or other values that are specific to a given user context. Code snippets can be contained in a data store and associated with various user actions so that they can be offered to the user at appropriate times and/or places during the user's work flow within the development environment. In one implementation, the process described in FIG. 3 herein can save the user from having to look up examples of a specific task from a help file, paste the example into the existing code, and then modify the pasted code snippet extensively to make it fit in with the existing code.

User actions are monitored during source code input in the development environment (stage 122). A triggering action is detected in the monitored user actions based upon the current context of the user (stage 124). One or more code snippets that are associated with the triggering action are identified from the code snippets contained in the data store (stage 126) or from another location. An option representing the code snippet is then presented to the user (stage 128). In other words, the user is made aware that the code snippet exists and that it can be applied to the existing source code. The user is then given an opportunity to accept and/or reject the option to apply the code snippet to existing code.

In response to the user selection of option, the code snippet is inserted into the code editor. One or more portions of the code snippet are automatically customized based upon the current context of the user (stage 130). In one implementation, the customization of the code snippet includes filling in at least some code placeholders in the code snippet with information contained in existing source code. This can include variable names already being used in the existing code or database connection strings already declared in existing code, just to name a few non-limiting examples. A hypothetical example will now be described in FIGS. 4-5 to further illustrate the concepts of offering and automatically completing code snippets for the user.

FIG. 4 is a simulated screen 160 for one implementation that illustrates the offering of a code snippet to the user in a development environment. In the code editor shown in FIG. 4, the user is creating a login method that connects to a database and then confirms that the user credentials specified on a certain user interface form are valid credentials contained in the database. In the example shown, the user has just finished typing a line of code 162 that places the value of the user name from the form into a local variable. The system was monitoring the user actions, and at that moment the line was completed, the system detected a triggering action. This led to the analysis and determination that the user is trying to perform login credential validation based upon the text box control referenced in the line of code. Thus, the system then provides the user with a code completion option 164 to have code automatically inserted to complete the login method. If the user clicks the apply option 166, then the code completion option will be applied to the existing code. If the user clicks the cancel option 168, then the code completion option will not be applied to the existing code.

FIG. 5 is a simulated screen 200 that illustrates an example result of applying the selected code snippet to the existing source code of FIG. 4 and then customizing the code snippet based upon the current context of the user. In the example shown in FIG. 5, a new line of code has been inserted to place the password value contained in the text box control on the form into the local variable for storing the password. Other lines of code were then inserted programmatically to evaluate the user name and password against values in the database. In one implementation, the system automatically connects to the database to determine the table that contains the user credentials, and then fills in the name of those fields programmatically for the user. In another implementation, the system just leaves placeholders for the names of the table and the database fields for the user to fill in after the code is inserted.

Figure 6:
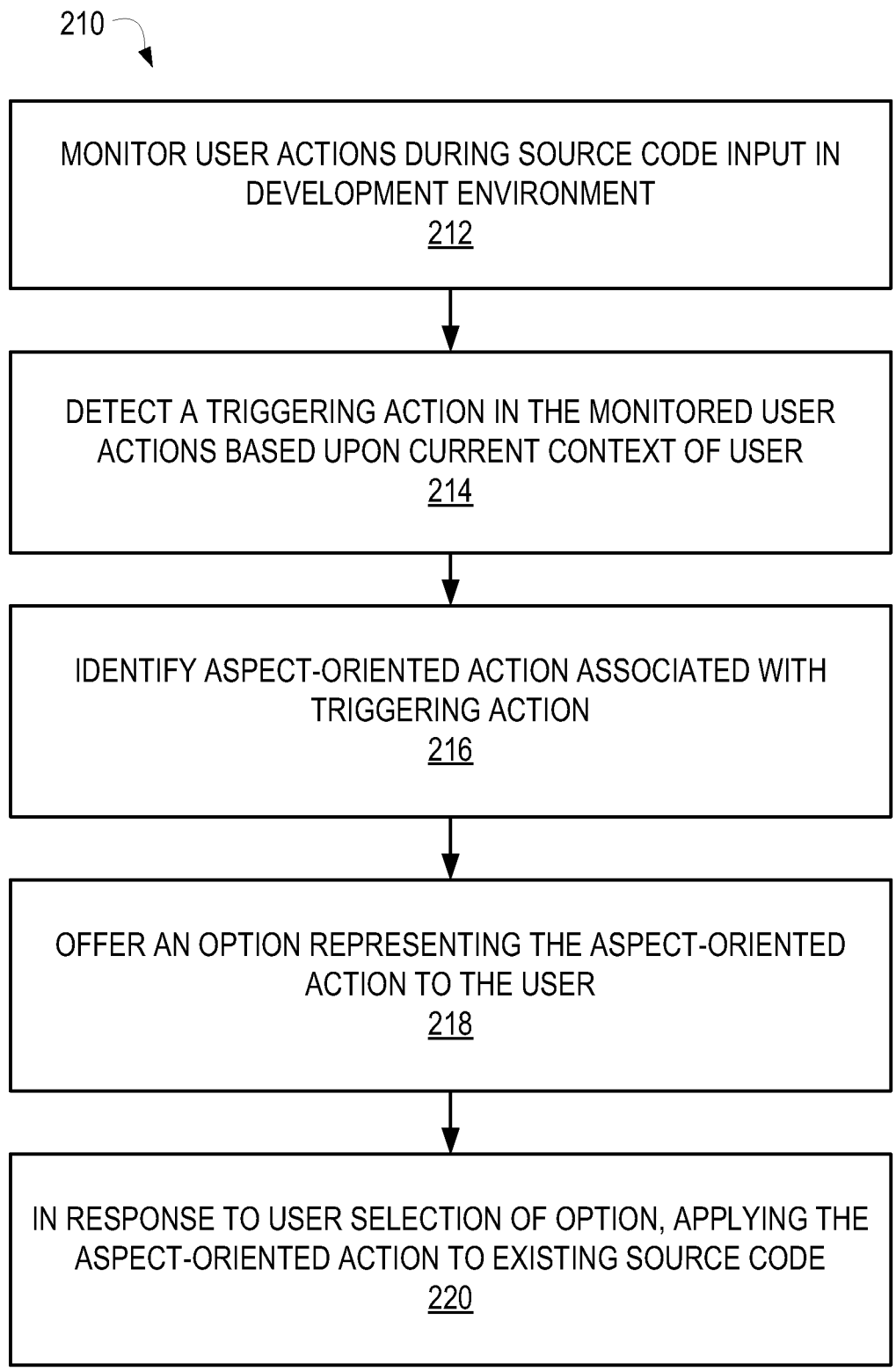
FIG. 6 is a process flow diagram for one implementation illustrating the stages involved in offering aspect-oriented actions to the user based upon user context, and applying the aspect-oriented actions to existing source code upon request.
Figure 7:
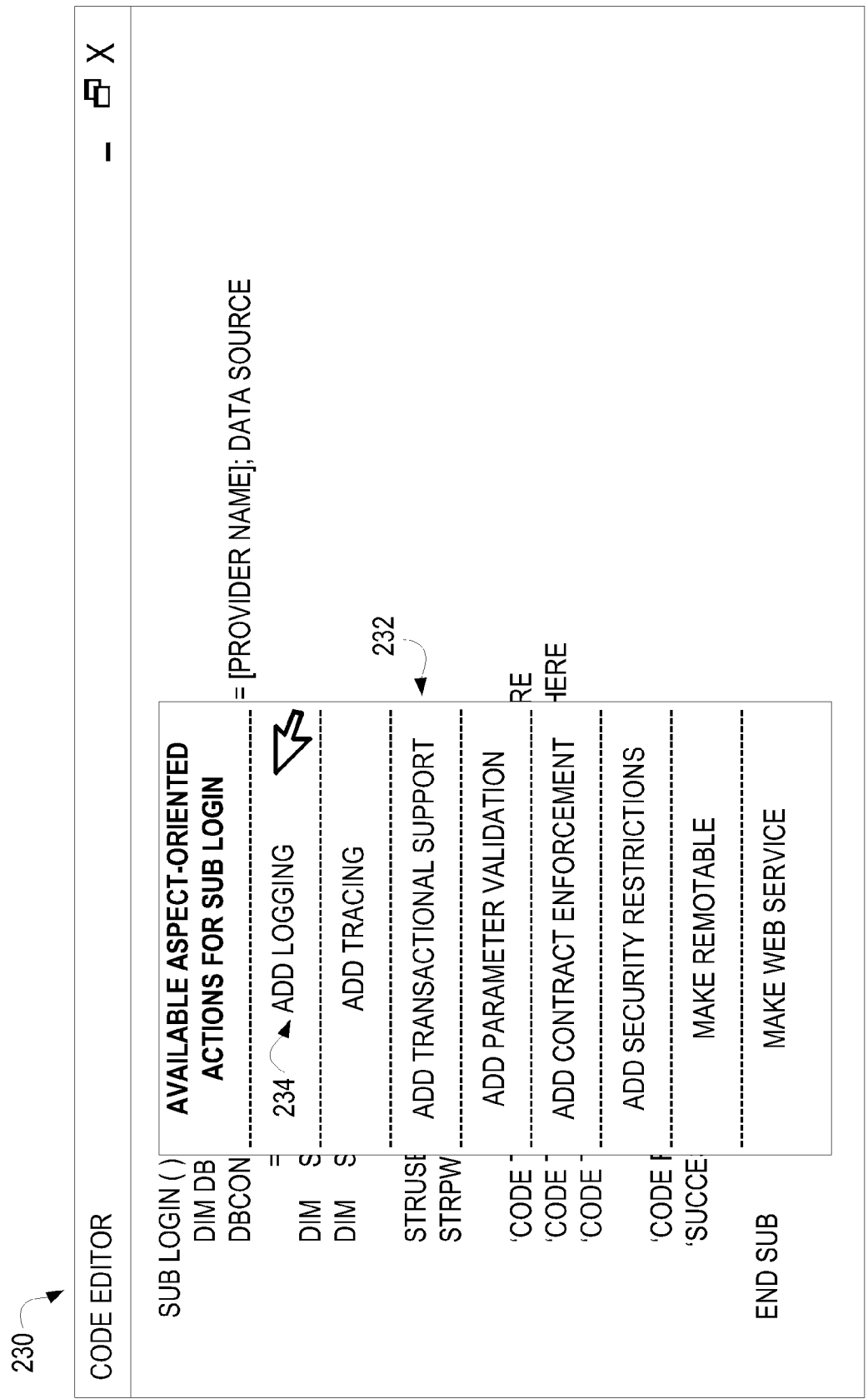
FIG. 7 is a simulated screen for one implementation that illustrates the offering of an aspect-oriented action to the user in a development environment.

Turning now to FIGS. 6-8, another exemplary implementation for utilizing code modification system 10 is now described in further detail. FIG. 6 is a process flow diagram 210 that illustrates one implementation of the stages involved in offering aspect-oriented actions to the user based upon user context, and applying the aspect-oriented actions to existing source code upon request. The term "aspect-oriented actions" as used herein is meant to include actions that are related to aspects that can be added to existing source code based upon aspect-oriented programming techniques. Before delving into the details of FIG. 6, some background about aspect-oriented programming is first necessary. Aspect-oriented programming is a complementary concept to object-oriented programming, and focuses on cross-cutting concerns that can span multiple classes, methods, or other units of code. Take error handling as an example. It is common for software developers to add error handling statements or error handling routines to each function or procedure that they write. The user has to remember to add the handler, to often customize it with the variables or other values contained in the current function or procedure, and then repeat the process for every single function or procedure. In such a scenario, whenever certain types of changes need to be made to the error handling process, the user may have to go back and modify each place where the error handler is contained and make the modification.

With aspect-oriented programming techniques, a new "aspect" can be created and then applied to one or more selected classes, functions, procedures, or other units of code. This aspect does not alter the existing units of code, but rather "sits on top of them" and gets later combined with the existing code by the compiler to generate the machine instructions necessary for carrying out the operation contained in the aspect. In other words, an aspect gets created separately from existing code, and then applied to select units of the code. The compiler can then combine the existing code with the aspect to generate the resulting machine code that carries out the desired result, which in effect, makes the code modification for the user without requiring the user to duplicate the code over and over again.

Returning to the discussion of FIG. 6, code completion system 10 can offer aspect-oriented actions to the user of the development environment. The user actions are monitored during source code input in the development of the environment (stage 212). As described in earlier figures, a triggering action in the monitored user actions can be detected based upon the current context of the user (stage 214). One or more aspect-oriented actions associated with the triggering action are identified (stage 216). In other words, an aspect-oriented action that is available based upon the user's current context can be identified. Several examples of aspect-oriented actions that could be offered to the user will be described next.

Some non-limiting examples of aspect-oriented actions include adding logging, adding tracing, adding transactional support, adding parameter validation, adding contract enforcement, adding security restrictions, making an object remotable, turning the object into a web service, and applying a security check.

The addition of logging means adding features to log certain values or activities to show that a given method or function was executed and/or a certain result that was achieved by executing that method or function. Tracing is similar to logging, and the addition of tracing means the tracking of certain values or features that are designed to diagnose where a certain problem occurs. A trace usually represents a path through a given system.

The addition of transactional support means transforming an existing unit of source code into source code that is executed as an atomic unit that either succeeds or fails as a unit. The addition of parameter validation means adding validation rules that ensure that the parameters being passed to a given function or method meet the data type and other restrictions that have been specified for the given method or function. The addition of contract enforcement means adding rules that ensure that the contract between two different methods or functions is enforced. This typically means ensuring that the values needed by a given receiving function or method are being passed in the manner needed in order for the receiving function to operate correctly.

The addition of security restrictions typically means adding security access levels or other security requirements that must be satisfied before the specified unit of code should be allowed to run.

By making an object remotable, the object can then be transmitted across remote computer boundaries in a fashion that leaves the object intact on the other side. By turning the object (function, procedure, or other unit of code) into a web service, this means that the object is then made available for access from external computers over standard Internet protocols such as HTTP.

By applying a security check to one or more units of source code, the system can determine if the source code meets various security guidelines that are associated with the security check.

Once the one or more aspect-oriented options that are available for the current user's context is identified, then an option representing the aspect-oriented action is offered to the user for consideration (stage 218). In one implementation, aspect-oriented actions can be offered when the user selects an option to see what available options exist for a class, method, function, or other unit of code. In another implementation, aspect-oriented actions can be offered when the system detects that the user is performing some task that would benefit from an aspect-oriented action or for which an aspect-oriented option is available. In yet another implementation, an option can be presented to allow the user to apply a particular aspect-oriented option to one or more units of code. In other words, the user can also be presented with the option to apply the aspect-oriented action to multiple units of code (such as multiple classes, functions, method, etc.).

In response to the user selection of the option, the aspect-oriented action is applied to the existing source code (stage 220). FIGS. 7 and 8 provide a hypothetical example of offering and applying aspect-oriented actions within a development environment.

FIG. 7 is a simulated screen 230 for one implementation that illustrates the offering of aspect-oriented actions to the user in a development environment. In the example shown, multiple aspect-oriented actions 232 are provided to the user for consideration. The user is currently working in a code editor in the development environment and has selected a login method to see what available options exist for that method. The available aspect-oriented actions 232 are then shown to the user. When the user selects the option 234 to add logging, then a new aspect is created for the login method.

FIG. 8 illustrates some exemplary source code 240 that shows how an aspect can be applied to the existing source code of FIG. 7. In the example shown in FIG. 8, a new aspect 242 is created to overlay the existing source code 244 that was presented in FIG. 7 previously. Notice how the source code of the existing login procedure is not modified. Instead, a new aspect 242 points to the existing login procedure. That new aspect will then be combined with the existing login procedure by the compiler or another process in order to apply the logging logic. In the example shown, the aspect is written in a different programming language than the existing login procedure. This is just an example to illustrate that the same or a different programming language could be used for creating aspects depending on the implementation.

Figure 9:
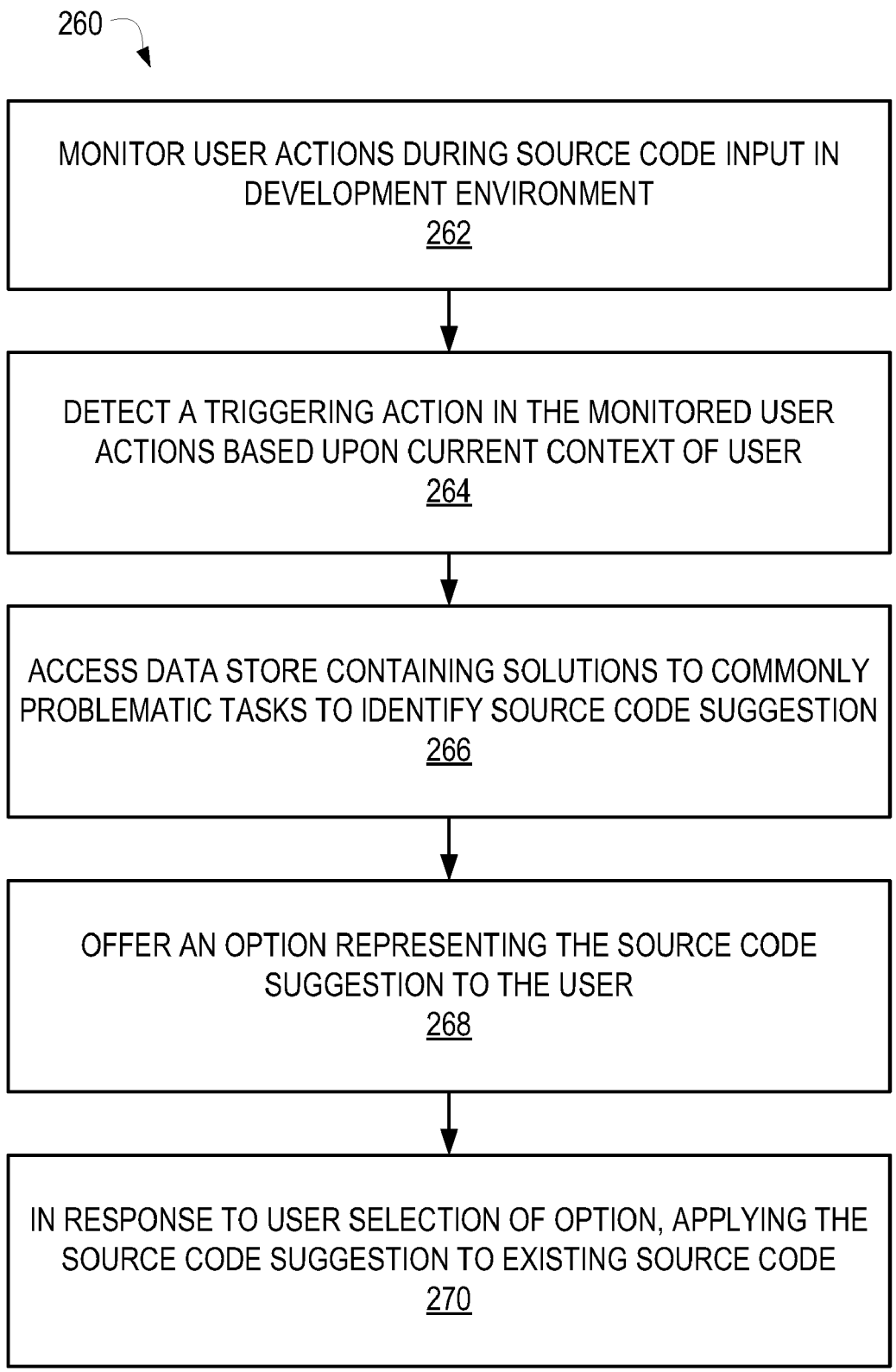
FIG. 9 is a process flow diagram for one implementation illustrating the stages involved in offering source code suggestions to the user based upon a data store of commonly problematic tasks and applying the code suggestions when selected by the user.
Figure 10:
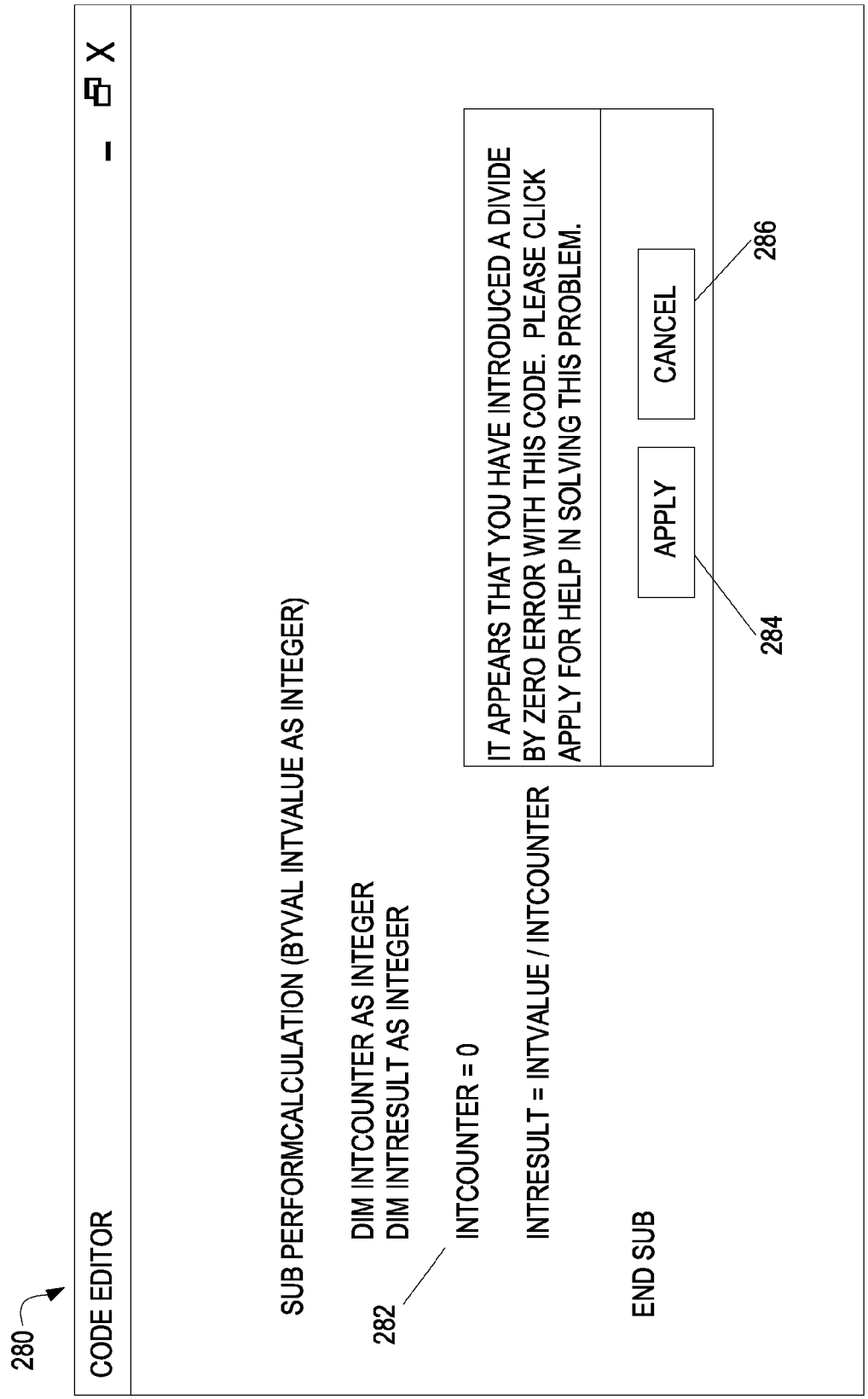
FIG. 10 is a simulated screen for one implementation that illustrates the detection of a divide by zero problem and offers a code suggestion to the user on how to correct the problem.

Turning now to FIGS. 9-11, another implementation for code modification system 10 is described. FIG. 9 is a process flow diagram 260 that illustrates one implementation of the stages involved in offering source code suggestions to the user. The user actions are monitored during source code input in the development environment (stage 262). A triggering action is detected in the monitored user actions based upon the current context of the user (stage 264). These steps have been described in detail in earlier figures, so they are not described again here for the sake of simplicity. A data store that contains solutions to commonly problematic tasks is accessed to identify one or more source code suggestions to offer to the user (stage 266). In one implementation, the source code suggestions are based upon common gaps in user knowledge. Common gaps in user knowledge can include the areas that are commonly unknown or problematic to many users in the industry, whether or not they are considered problematic to the current user. In another implementation, the source code suggestions are based upon suggestions for how to fix errors that are contained in the existing source code.

Once one or more available source code suggestions are identified, an option that represents an identified source code suggestions is then presented to the user (stage 268). In response to the user selection of the option, the source code suggestion is applied to the existing source code (stage 270). When applying the source code suggestion to the existing source code, new source code can be added to replace existing source code and/or existing source code can be modified. The source code that is modified can include source code in multiple programming languages that make up a given project.

A hypothetical example for how source code suggestions can be offered and applied is shown in FIGS. 10 and 11. FIG. 10 is a simulated screen 280 for one implementation that illustrates the detection of a divide by zero problem and offers a code suggestion to the user on how to correct the problem. In the example shown, the user has declared a new variable called intCounter, and then initialized that variable to 0 (line 282). The problem with this code as it is written is that the next line of code then divides the incoming value called intValue by the intCounter value, which is currently still at zero. This will result in a divide by zero error the way it is written. Thus, after the user finished typing the line that contains the divide by zero problem, an option is presented to the user to have the system assist with fixing this problem. If the user selects the apply option 284, then a suggested solution is inserted into the code. If the user selects the cancel option 286, then the option is dismissed.

FIG. 11 is a simulated screen 290 that shows an example of a suggestion that is inserted when the user selects the apply option (284 on FIG. 10). In this example, the system inserted a comment 292 which describes how the problem can be fixed by inserting code at that spot which sets the value of intCounter to some value other than zero. In this example, the system is not actually fixing the code for the user, but is making a suggestion for what the user needs to do in order to fix the problem. In other implementations, the system may actually insert a line of code that would fix the problem, when such a fix can be determined programmatically.

Figure 12:
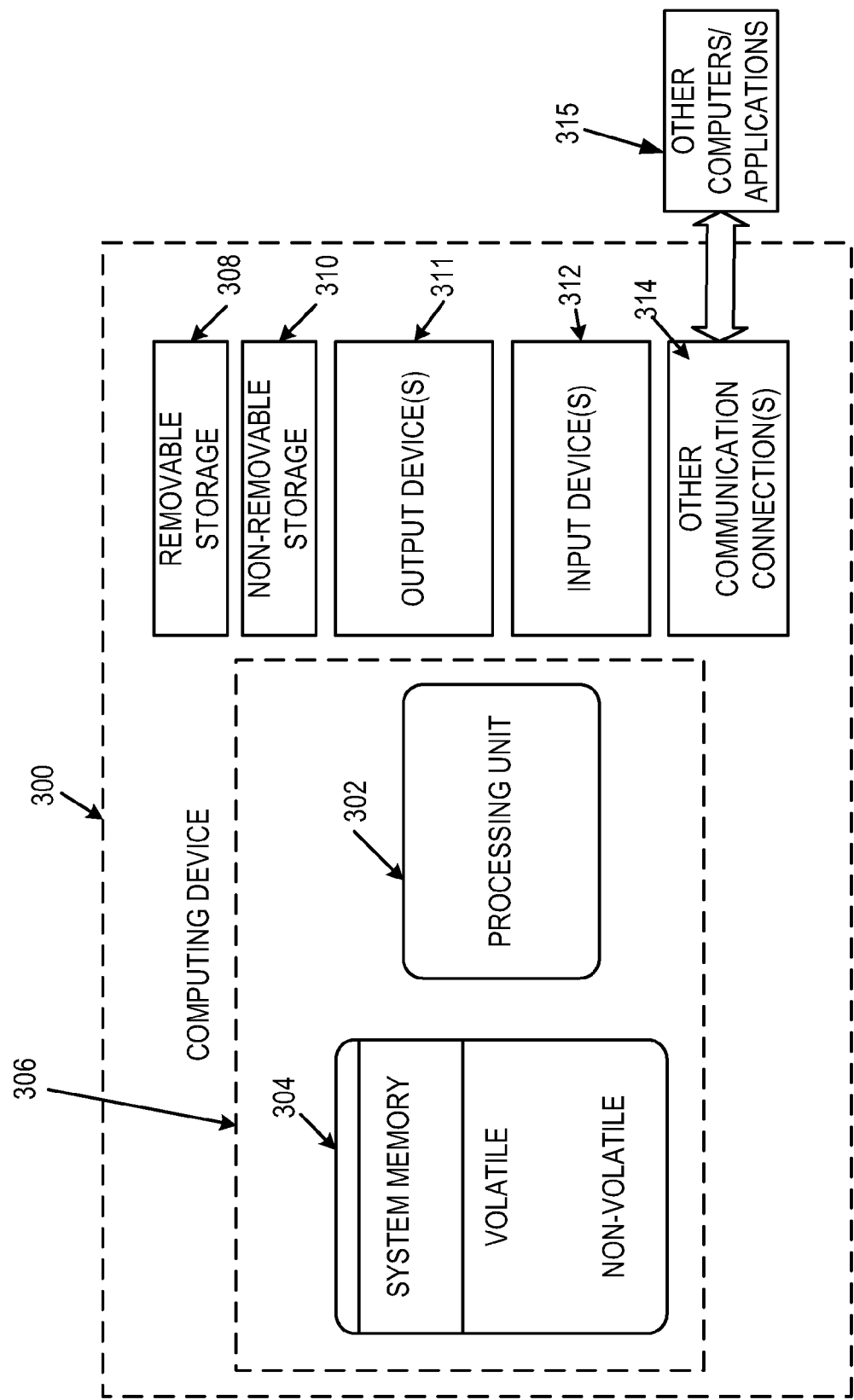
FIG. 12 is a diagrammatic view of a computer system of one implementation.

As shown in FIG. 12, an exemplary computer system to use for implementing one or more parts of the system includes a computing device, such as computing device 300. In its most basic configuration, computing device 300 typically includes at least one processing unit 302 and memory 304. Depending on the exact configuration and type of computing device, memory 304 may be volatile (such as RAM), non-volatile (such as ROM, flash memory, etc.) or some combination of the two. This most basic configuration is illustrated in FIG. 12 by dashed line 306.

Additionally, device 300 may also have additional features/functionality. For example, device 300 may also include additional storage (removable and/or non-removable) including, but not limited to, magnetic or optical disks or tape. Such additional storage is illustrated in FIG. 12 by removable storage 308 and non-removable storage 310. Computer storage media includes volatile and nonvolatile, removable and non-removable media implemented in any method or technology for storage of information such as computer readable instructions, data structures, program modules or other data. Memory 304, removable storage 308 and non-removable storage 310 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 300. Any such computer storage media may be part of device 300.

Computing device 300 includes one or more communication connections 314 that allow computing device 300 to communicate with other computers/applications 315. Device 300 may also have input device(s) 312 such as keyboard, mouse, pen, voice input device, touch input device, etc. Output device(s) 311 such as a display, speakers, printer, etc. may also be included. These devices are well known in the art and need not be discussed at length here. In one implementation, computing device 300 includes code modification system 10.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A system for automatically offering and filling in source code snippets based upon a context of a user in a development environment, the system comprising:
   one or more processors configured to provide:
   a code editor that accepts user input comprising source code;
   a data store that stores a plurality of code snippets of sample source code; and
   a code completion tool that:
      monitors user actions during source code input in the development environment;
      detects a triggering action in the monitored user actions, the triggering action being based upon a current context of the user;
      identifies a code snippet associated with the triggering action from the plurality of code snippets stored in the data store;
      offers an option representing the code snippet; and
      in response to user selection of the option, inserts the code snippet associated with the triggering action into the code editor and automatically customizes the code snippet based upon the current context of the user, the customization of the code snippet including filling in at least some code placeholders in the code snippet with information contained in existing source code, the information being present in the existing source code at the time the triggering action is detected.

2. The system of claim 1, wherein the filling in at least some code placeholders including automatically connecting to a database accessed by the existing code to determine a table field name and filling in the table field name for a placeholder in the code snippet.

3. A method for automatically offering aspect-oriented source code transformations based upon a context of a user in a development environment comprising the steps of:
   monitoring user actions during source code input in the development environment;
   detecting a triggering action in the monitored user actions;
   in response to detecting the trigger action, identifying an aspect-oriented action associated with the triggering action;
   in response to identifying the aspect-oriented action, offering a first option representing the aspect-oriented action and offering a second option to apply the aspect-oriented action to a plurality of units of code; and
   in response to user selection of the first option, applying the aspect-oriented action to existing source code, applying being performed by one or more processors and, when a user selects the second option, applying including applying the aspect-oriented action to the plurality of units of code, applying the aspect-oriented action to the plurality of units of code including inserting a code portion into the existing source code in at least one position, the position being associated with the aspect-oriented action.

4. The method of claim 3, wherein the applying step involves transforming the existing source code to add an aspect that will be applied to one or more identified units of the source code, the aspect corresponding to the aspect-oriented action.

5. The method of claim 4, wherein the aspect is designed to perform logging to the one or more identified units of the source code.

6. The method of claim 4, wherein the aspect is designed to add security restrictions to the one or more identified units of the source code.

7. The method of claim 4, wherein the aspect is designed to transform the one or more identified units of source code into a remotable object.

8. The method of claim 4, wherein the aspect is designed to transform the one or more identified units of source code into a web service.

9. The method of claim 4, wherein the aspect is designed to add tracing to the one or more identified units of source code.

10. The method of claim 4, wherein the aspect is designed to add transactional support to the one or more identified units of source code.

11. The method of claim 4, wherein the aspect is designed to add parameter validation to the one or more identified units of source code.

12. The method of claim 4, wherein the aspect is designed to add contract enforcement to the one or more identified units of source code.

13. The method of claim 3, wherein the aspect-oriented action is related to a security check.

14. The method of claim 13, wherein during the applying step, the security check is applied to one or more identified units of source code to determine if the one or more selected units of source code meet a plurality of security guidelines associated with the security check.

15. A method for automatically offering source code suggestions based upon a context of a user in a development environment comprising the steps of:

monitoring user actions during source code input in the development environment;

detecting a triggering action in the monitored user actions;

response to detecting the triggering action, accessing a data store containing solutions to commonly problematic tasks to identify a source code suggestion associated with the triggering action;

in response to detecting the triggering action, offering an option representing the source code suggestion; and in response to user selection of the option, applying the source code suggestion to existing source code, applying being performed by one or more processors, applying including inserting a comment into the existing source code, the comment describing at least one change that would address a commonly problematic task associated with the triggering action by altering existing code at a position in the existing source code, the position being associated with the commonly problematic task.

16. The method of claim 15, wherein during the applying step, new source code is added to replace existing source code.

17. The method of claim 15, wherein during the applying step, existing source code is modified.

18. The method of claim 15, wherein the source code suggestion is based upon common gaps in user knowledge.

19. The method of claim 15, wherein the source code suggestion is applied to existing source code to fix an error contained in the existing source code.

20. The method of claim 15, wherein the source code suggestion is applied to existing source code that is contained in a source code files of different syntaxes.

* * * * *